United States Patent [19]

Gregorcyk

[11] Patent Number: 4,648,059

[45] Date of Patent: Mar. 3, 1987

[54] N-BIT MAGNITUDE COMPARATOR

[75] Inventor: Arthur J. Gregorcyk, Austin, Tex.

[73] Assignee: Motorola, Inc., Schaumburg, Ill.

[21] Appl. No.: 649,879

[22] Filed: Sep. 13, 1984

[51] Int. Cl.$^4$ .............................................. G05F 7/50
[52] U.S. Cl. .................................. 364/769; 340/146.2
[58] Field of Search ...................... 364/769; 340/146.2

[56] References Cited

U.S. PATENT DOCUMENTS

| 3,196,262 | 7/1965 | Thompson | 364/769 |
| 3,241,114 | 3/1966 | Zieper et al. | 340/146.2 |
| 3,576,531 | 4/1971 | Scott | 340/146.2 |
| 4,450,432 | 5/1984 | Schmidtpott et al. | 340/146.2 |

OTHER PUBLICATIONS

"Digital Logic and Computer Design", M. Morris Mano, 1979, pp. 382-384.

Primary Examiner—James D. Thomas
Assistant Examiner—Long T. Nguyen
Attorney, Agent, or Firm—John A. Fisher; Jeffrey Van Myers; Jonathan P. Meyer

[57] ABSTRACT

A circuit for selectively determining whether a first number is greater than or equal to or less than or equal to a second number, comprising a means for adding a first number and a complementary function of a second number, and logic means for generating a signal for carry-in and for combination with a carry-out of the means for adding for producing a signal indicative of whether the second number is within the parameters established by the first number and the carry-in.

8 Claims, 1 Drawing Figure

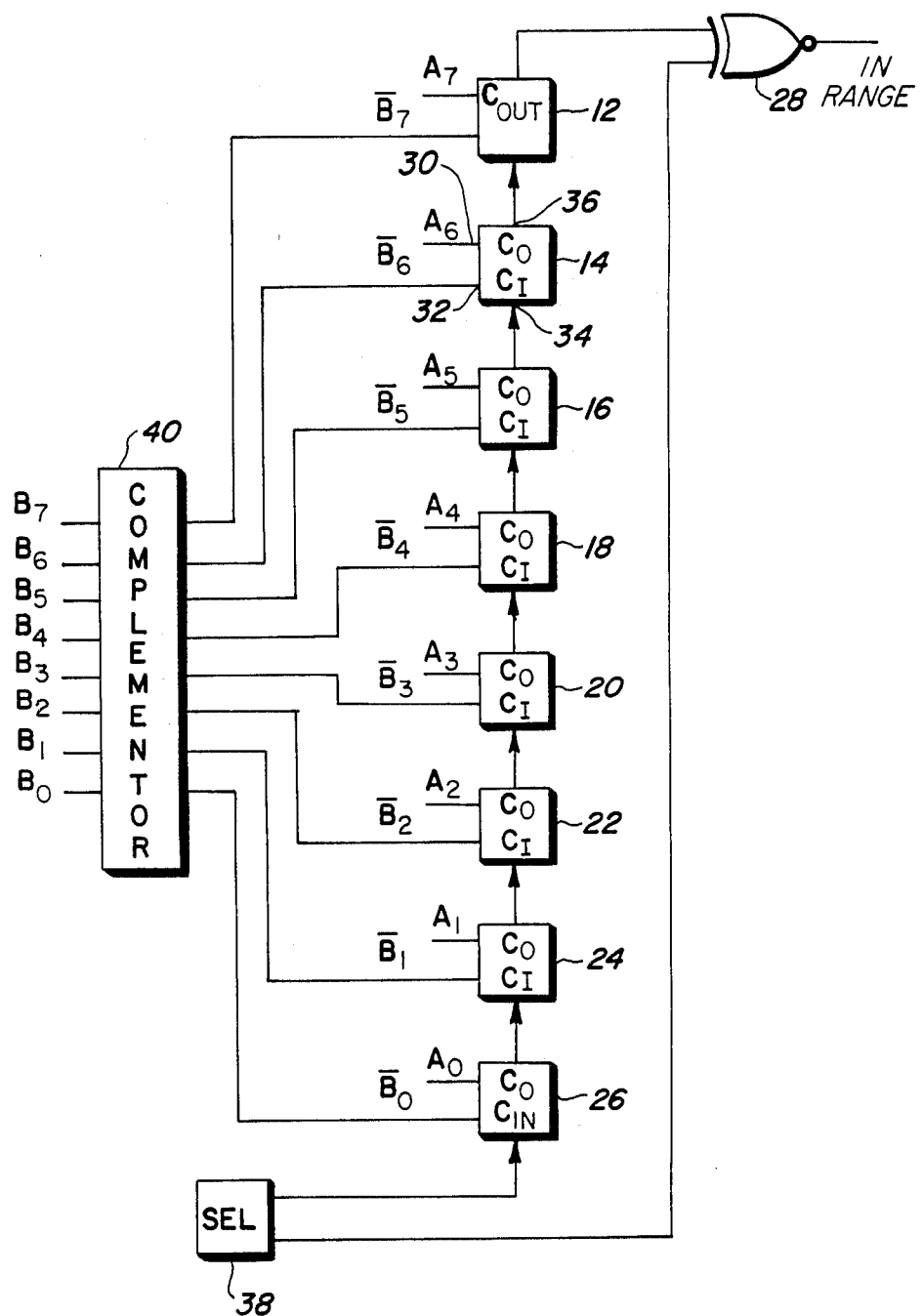

N-BIT MAGNITUDE COMPARATOR

FIELD OF THE INVENTION

This invention relates to logic circuits, and more specifically to circuits for determining magnitude relationships between a pair of binary numbers.

BACKGROUND ART

It is frequently desirable to make comparisons of the magnitudes of two numbers in binary or a binary coded form. Digital data processing devices continually use such comparisons in the execution of programs where, for example, a branch to a routine or sub-routine is made within a program on the basis of whether a given number is higher or lower than another number.

Comparisons of this nature are frequently made with hardware comparators which usually are capable of providing a "greater than" or "less than" indication only, or such an indication with the addition of an equality indication. Therefore if a comparison such as "greater than or equal to" or "less than or equal to" is required, a series of operations must be performed to determine whether the numbers are equal, and then whether "greater than" or "less than", and the results of the comparisons are then logically combined to indicate the required full comparison.

In certain operations performed by digital computers, it is essential to perform a "greater than or equal to" or "less than or equal to" comparison with minimum delay and with the ability to switch rapidly between the two comparison modes.

SUMMARY OF THE INVENTION

It is an object of this invention to provide a method and means for implementing a "greater than or equal to" and a "less than or equal to" determination with minimum time delay and with a minimum of delay in switching between the two comparison modes.

It is a further object of the invention to provide an improved comparison method and apparatus.

These and other objects and advantages are accomplished by providing a circuit for selectively determining whether a first number is greater than or equal to or less than or equal to a second number, comprising a means for adding a first number and a complementary function of a second number, and logic means for generating a signal for carry-in and for combininination with a carry-out of the means for adding for producing a signal indicative of whether the second number is within the parameters established by the first number and the carry-in.

BRIEF DESCRIPTION OF THE DRAWING

The FIGURE shows a logic diagram of a circuit embodying the invention and for carrying out the method thereof.

DETAILED DESCRIPTION OF A PREFERRED EMBODIMENT

The FIGURE shows an n-bit magnitude comparator which allows switching between a greater than or equal to and a less than or equal to comparison with only one control bit. The comparator is constructed of a plurality of adders 12, 14, 16, 18, 20, 22, 24, 26, and an Exclusive-NOR gate 28. While an 8-bit comparator is shown here, it is understood that a comparator of any number of bits may be implemented by increasing or decreasing the number of adder units to correspond to the number of bits of comparison desired.

Each of the adders of the circuit has (and with reference specifically to adder 14) a first input 30 (A input) and a second input 32 (B input), a carry-in terminal 34 for receiving a carry signal from a preceding stage, and a carry-out terminal 36 for providing a carry signal to a subsequent stage. The carry-out line of the most significant digit adder 12 is provided as an input to one terminal of the Exclusive-NOR gate (EXNOR) 28. A carry-in signal to the carry-in terminal of the least significant digit adder is provided from a register 38 as a selection signal to determine whether the operation to be performed is a greater than or equal to or a less than or equal to comparison. Thus the carry-in signal itself is used to switch between the two comparison modes. The same carry-in signal is also applied to the second input terminal of the EXNOR gate 28. As will be seen, the application of the operation-determining signal to this EXNOR gate functions to directly create an in-range or out-of-range result. The A input to each adder represents the number with which a comparison is to be made. The B input is the one's complement of the number to be compared, and is represented as B. The B input signals may be provided by a complementer 40 which inverts each of the bits of the B word.

It has been discovered that, if the one's complement of a number is added to a second number, the carry out of the most significant digit of the sum when Exclusive-NORed with zero represents a true-false condition of whether the first number is equal to or greater than the second. It has further been discovered that if the two's complement of a number is added to a second number the carry-out of the sum when Exclusive-NORed with one is representative of a true-false condition of whether the first number is less than or equal to the second. Applying these principles to the circuit of the FIGURE, if $A = 1101100$ and $B = 1011001$ (with the most significant digits on the left), the one's complement of $B = 0100110$. With no carry-in to adder 26 (establishing the test as whether B is greater than or equal to A), a carry-out will be generated from the sum of A and B(1's complement). Since the carry-in is zero, the second input to EXNOR gate 28 is also zero, so the output of the EXNOR is zero indicating that B is not greater than or equal to A. By inspection this can be determined to be true.

Likewise, if the test were to determine whether B is less than or equal to A, a two's complement of B is generated merely by providing a carry-in to adder 26, since the two's complement of a number is formed by adding a one to the one's complement. The sum with A again generates a carry-out at adder 12, but in this case a one is also applied to the second input of the EXNOR gate 28, since the carry-in, whether 1 or 0, is always the second input to EXNOR 28. The output of EXNOR 28 in this case is 1 indicating that the condition (B less than or equal to A) is true.

It can be seen that if A and B are equal, the resultant output of the EXNOR will be one, or true, regardless of whether a carry-in is or is not used; thus equality satisfies both tests, as it should.

I claim:

1. A circuit for comparing a first number to a second number comprising:
    select means for selecting one of a determination of whether the first number is greater than or equal to the second number and a determination of whether the first number is less than or equal to the second number;

complement means for providing a complement of the first number;

adder means for adding the complement of the first number to the second number and for producing a carry-out signal; and output means responsive to the carry-out signal and to the select means for providing a true-false indication of the selected determination.

2. A circuit as set forth in claim 1 wherein the complement of the first number is one of a one's complement and a two's complement and wherein the select means further selects whether the complement is a one's complement or a two's complement.

3. A circuit as set forth in claim 2 wherein the select means further comprises means for providing a single digital value as input to a carry-in input of the adder means and to the output means.

4. A circuit as set forth in claim 3 wherein said output means comprises an Exclusive-NOR gate.

5. A method of comparing a first number to a second number comprising the steps of:
selecting one of a determination of whether the first number is greater than or equal to the second number and a determination of whether the first number is less than or equal to the second number;

providing a complement of the first number;

adding the complement of the first number to the second number in an adder and producing a carry-out signal; and logically operating on the carry out signal in an output means to produce a true-false indication of the selected determination.

6. A method as set forth in claim 5 wherein the complement of the first number is one of a one's complement and a two's complement and the step of selecting further comprises a selection of the one's complement or the two's complement.

7. A method as set forth in claim 6 wherein the step of selecting further comprises the step of providing a single digital value as a carry-in input to the adder and as an input to the output means.

8. A method as set forth in claim 7 wherein the output means comprises an Exclusive-NOR gate.

* * * * *